United States Patent
Lin et al.

(10) Patent No.: US 11,870,991 B2
(45) Date of Patent: ***Jan. 9, 2024

(54) METHOD AND APPARATUS OF ENCODING OR DECODING VIDEO BLOCKS WITH CONSTRAINTS DURING BLOCK PARTITIONING

(71) Applicant: HFI Innovation Inc., Zhubei (TW)

(72) Inventors: Zhi-Yi Lin, Hsinchu (TW); Tzu-Der Chuang, Hsinchu (TW); Ching-Yeh Chen, Hsinchu (TW); Chia-Ming Tsai, Hsinchu (TW)

(73) Assignee: HFI INNOVATION INC., Zhubei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/150,576

(22) Filed: Jan. 5, 2023

(65) Prior Publication Data

US 2023/0140961 A1  May 11, 2023

Related U.S. Application Data

(63) Continuation of application No. 17/414,662, filed as application No. PCT/CN2019/124271 on Dec. 10, 2019, now Pat. No. 11,589,050.

(Continued)

(51) Int. Cl.
*H04N 19/119* (2014.01)
*H04N 19/105* (2014.01)
(Continued)

(52) U.S. Cl.
CPC ......... *H04N 19/119* (2014.11); *H04N 19/105* (2014.11); *H04N 19/132* (2014.11);
(Continued)

(58) Field of Classification Search
CPC .. H04N 19/103; H04N 19/105; H04N 19/119; H04N 19/159; H04N 19/70; H04N 19/136
See application file for complete search history.

(56) References Cited

U.S. PATENT DOCUMENTS 10,334,259 B2  6/2019  Zhang et al.
11,245,932 B2  2/2022  Wang et al.
(Continued)

FOREIGN PATENT DOCUMENTS

EP  1 009 160 A1  6/2000
EP  3 402 190 A1  11/2018
(Continued)

OTHER PUBLICATIONS

"Video Compression Using Nested Quadtree Structures, Leaf Merging, and Improved Techniques for Motion Representation and Entropy Coding"—Detlev Marpe et al.; IEEE Transactions on Circuits and Systems for Video Technology, vol. 20, No. 12, Dec. 2010. (Year: 2010).*

(Continued)

*Primary Examiner* — Mainul Hasan
(74) *Attorney, Agent, or Firm* — McClure, Qualey & Rodack, LLP

(57) ABSTRACT

Video processing methods include receiving input data of a current block in a current slice, determine determining whether one or more components of the current block satisfy one or more predefined criteria during partitioning, and applying a mode constraint to the current block only if the one or more components of the current block satisfy the one or more predefined criteria, wherein the mode constraint restricts all blocks within the current block to be processed by a same prediction mode when the current block is split into a plurality of blocks. The methods adaptively split the current block into one or more blocks, and pare one or more (Continued)

prediction mode syntax elements of a first block in the current block according to a constrained mode of the current block. The methods further encode the current block with the mode constraint.

9 Claims, 7 Drawing Sheets

Related U.S. Application Data

(60) Provisional application No. 62/807,803, filed on Feb. 20, 2019, provisional application No. 62/794,802, filed on Jan. 21, 2019, provisional application No. 62/781,130, filed on Dec. 18, 2018.

(51) Int. Cl.
*H04N 19/132* (2014.01)
*H04N 19/159* (2014.01)
*H04N 19/176* (2014.01)
*H04N 19/186* (2014.01)
*H04N 19/70* (2014.01)

(52) U.S. Cl.
CPC ......... *H04N 19/159* (2014.11); *H04N 19/176* (2014.11); *H04N 19/186* (2014.11); *H04N 19/70* (2014.11)

(56) References Cited

U.S. PATENT DOCUMENTS

| | | | |
|---|---|---|---|
| 11,589,050 B2* | 2/2023 | Lin | H04N 19/186 |
| 2013/0039422 A1 | 2/2013 | Kirchhoffer et al. | |
| 2015/0063440 A1* | 3/2015 | Pang | H04N 19/61 375/240.02 |
| 2020/0029071 A1 | 1/2020 | Kang et al. | |
| 2021/0044839 A1* | 2/2021 | Wang | H04N 19/157 |
| 2021/0250649 A1* | 8/2021 | Zhang | H04N 19/13 |

FOREIGN PATENT DOCUMENTS

| | | | | |
|---|---|---|---|---|
| TW | I538481 B | 6/2016 | | |
| WO | 2015/035449 A1 | 3/2015 | | |
| WO | 2018/001207 A1 | 1/2018 | | |
| WO | 2018/070742 A1 | 4/2018 | | |
| WO | 2018/206396 A1 | 11/2018 | | |
| WO | 2019/002615 A1 | 1/2019 | | |
| WO | 2019/026807 A1 | 2/2019 | | |
| WO | WO-2019026807 A1 | * | 2/2019 | |
| WO | 20191/85815 A1 | 10/2019 | | |
| WO | WO-2019185815 A1 | * | 10/2019 | ........... H04N 19/119 |
| WO | 2020/016795 A1 | 1/2020 | | |
| WO | WO-2020016795 A2 | * | 1/2020 | ........... H04N 19/105 |
| WO | 2020/044255 A1 | 3/2020 | | |
| WO | WO-2020044255 A1 | * | 3/2020 | |

OTHER PUBLICATIONS

International Search Report and Written Opinion dated Mar. 6, 2020, issued in application No. PCT/CN2019/124271.
Xu, X., et al.; "Intra Block Copy in HEVC Screen Content Coding Extensions;" IEEE Journal on Emerging and Selected Topics in Circuits and Systems; vol. 6; No. 4; Dec. 2016; pp. 409-419.
Xu, X., et al.; "Block Vector Prediction in Intra Block Copy for HEVC Screen Content Coding;" 2015 Data Compression Conference; Jul. 2015; pp. 273-282.
Chinese language Notice of Allowance dated Aug. 10, 2021, issued in application No. TW 108145286.
Extended European Search Report dated Jul. 29, 2022 issued in application No. EP 19897770.4.
Chinese language office action dated Apr. 24, 2023, issued in application No. CN 201980084170.3.
Zhou, Y., et al.; "Action recognition algorithm under complex scenes based on local part model;" Chinese Journal of Liquid Crystals and Displays; vol. 32; No. 9; Sep. 2017; pp. 748-754.
Abstract of "Action recognition algorithm under complex scenes based on local part model" (p. 1 of publication).

* cited by examiner

MxM　　　　M/2xM　　　　MxM/2　　　　M/2xM/2

M/4xM (L)　　M/4xM (R)　　MxM/4 (U)　　MxM/4 (D)

METHOD AND APPARATUS OF ENCODING OR DECODING VIDEO BLOCKS WITH CONSTRAINTS DURING BLOCK PARTITIONING

CROSS REFERENCE TO RELATED APPLICATIONS

The present invention is a Continuation of patent application Ser. No. 17/414,662, filed on Jun. 16, 2021 (now U.S. Pat. No. 11,589,050, issued Feb. 21, 2023), which is a 371 National Phase of PCT Application, Serial No. PCT/CN2019/124271, filed on Dec. 10, 2019, which claims priority to U.S. Provisional Patent Application, Ser. No. 62/781,130, filed on Dec. 18, 2018, entitled "CU partitioning method for small size CU", U.S. Provisional Patent Application, Ser. No. 62/794,802, filed on Jan. 21, 2019, entitled "CU partitioning method for small size CU", and U.S. Provisional Patent Application, Ser. No. 62/807,803, filed on Feb. 20, 2019, entitled "CU partitioning method for small size CU with mode constraints" The above U.S. Provisional Patent Applications are hereby incorporated by reference in their entireties.

FIELD OF THE INVENTION

The present invention relates to video encoding and decoding by partitioning video data into blocks. In particular, the present invention relates to encoding and decoding video blocks with one or more constraints during block partitioning.

BACKGROUND AND RELATED ART

The High Efficiency Video Coding (HEVC) standard is the latest video coding standard developed by the Joint Collaborative Team on Video Coding (JCT-VC)) group of video coding experts from ITU-T Study Group. The HEVC standard relies on a block-based coding structure which divides each slice into multiple Coding Tree Units (CTUs). A coded picture is represented by one or a collection of slices, each slice includes an integer number of CTUs. The individual CTUs in a slice are processed according to a raster scanning order. In the HEVC main profile, minimum and maximum sizes of a CTU are specified by syntax elements in the Sequence Parameter Set (SPS) among the sizes of 8×8, 16×16, 32×32, and 64×64. Sample values of each block in a Bi-predictive (B) slice are decoded using intra picture prediction or inter picture prediction using at most two motion vectors and reference indices. Sample values of each block in a Predictive (P) slice is decoded using intra picture prediction or inter picture prediction using only one motion vector and reference index. An Intra (I) slice is decoded using intra picture prediction only. Each CTU is further recursively divided into one or more Coding Units (CUs) according to a quadtree (QT) splitting process to adapt to various local motion and texture characteristics. An example of the quadtree block partitioning structure for splitting a CTU into multiple CUs is illustrated in FIG. 1, where solid lines indicate CU boundaries in CTU 100. Each CTU is either a single CU or split into four smaller units of equal size, which are nodes of a coding tree. If a node is not further split, it is a leaf node of the coding tree, and each leaf node is a CU. The quadtree splitting process can be iterated until the size of a node reaches a minimum allowed CU size specified in the SPS.

The prediction decision is made at the CU level, where each CU is either coded by inter picture (temporal) prediction or intra picture (spatial) prediction. Since the minimum CU size can be 8×8, the minimum granularity for switching different basic prediction type is 8×8. Once the splitting of CU hierarchical tree is done, each CU is subject to further split into one or more Prediction Units (PUs) according to a PU partition type for prediction. FIG. 2 shows eight PU partition types defined in the HEVC standard. Each CU is split into one, two, or four PUs according to one of the eight PU partition types shown in FIG. 2. The PU, together with the associated CU syntax, works as a basic representative block for sharing the prediction information as the same prediction process is applied to all pixels in the PU and prediction relevant information is conveying to the decoder on a PU basis. A specified prediction process is employed to predict the values of associated pixel samples inside the PU. After obtaining a residual signal generated by the prediction process, residual data of the residual signal belong to a CU is split into one or more Transform Units (TUs) according to a Residual QuadTree (RQT) block partitioning structure for transforming the residual data into transform coefficients for compact data representation. Dashed lines in FIG. 1 indicate TU boundaries. A TU is a basic representative block for applying transform and quantization on the residual signal and transform coefficients respectively. For each TU, a transform matrix having the same size as the TU is applied to the residual signal to generate the transform coefficients, and these transform coefficients are quantized and conveyed to the decoder on a TU basis. A transform unit is composed of a Transform Block (TB) of luma samples of size 8×8, 16×16, or 32×32, and two corresponding transform blocks of chroma samples in a picture coded according to a 4:2:0 color format. An integer transform is applied to a transform block and the level values of the quantized coefficients together with the other side information are entropy coded in the video bitstream.

The terms Coding Tree Block (CTB), Coding block (CB), Prediction Block (PB), and Transform Block (TB) are defined to specify two-dimensional sample array of one color component associated with the CTU, CU, PU, and TU respectively. For example, a CTU consists of one luminance (luma) CTB, two chrominance (chroma) CTBs, and its associated syntax elements. In the HEVC system, the same quadtree block partitioning structure is generally applied to both luma and chroma components unless a minimum size for chroma block is reached.

Binary-tree (BT) splitting structure is an alternative structure to the quadtree splitting structure which recursively divides a block into two smaller blocks. The most efficient and simplest binary tree splitting types are symmetric horizontal and symmetric vertical splitting types. For a given block of size M×N, a flag is signaled to indicate whether this block is split into two smaller blocks, if true, another syntax element is signaled to indicate which splitting type is used. In a case when the given block is partitioned by the symmetric horizontal splitting type, the given block is split into two blocks of size M×N/2, otherwise, the given block is split into two blocks of size M/2×N. The binary tree splitting process can be iterated until the size, width, or height of a block reaches a minimum allowed block size, width, or height defined in a high level syntax element. Both the minimum allowed block width and height are specified as there are horizontal and vertical splitting types in the binary tree splitting process. The horizontal splitting type is implicitly prohibited when the splitting results in a block height smaller than the specified minimum height. Similarly, the vertical splitting type is implicitly prohibited when the splitting results in a block width smaller than the specified minimum width. The binary tree structure can be used to partition a block into multiple smaller blocks, for example, it can be used to partition a slice into CTUs, a CTU into CUs, a CU into PUs, or a CU into TUs.

The binary tree structure is more flexible than the quadtree structure as more partition shapes can be supported, which is also a source of coding efficiency improvement. However, the encoding complexity is also increased as the encoder needs to determine a best partition shape from variety of partition shapes. A new splitting structure called QuadTree plus Binary Tree (QTBT) structure balances the coding efficiency and the coding complexity of the quadtree splitting structure and the binary tree splitting structure. An exemplary QTBT structure is shown in FIG. 3A, where a CTU is firstly partitioned by a quadtree structure then a binary tree splitting structure. The CUs can be recursively partitioned by quadtree splitting until a current CU size reaches a minimum allowed quadtree leaf node size. Each leaf quadtree block may be partitioned by binary tree splitting if the leaf quadtree block size is not larger than a maximum allowed binary tree root node size. The binary-tree splitting may be recursively applied until the current CU size, width, or height reaches a minimum allowed binary tree leaf node size, width, or height or the binary tree depth reaches a maximum allowed binary tree depth. Only horizontal symmetrical splitting and vertical symmetrical splitting are the two allowed binary tree splitting types in QTBT splitting. The resulting leaf CUs from QTBT splitting may be employed for prediction and transform processing without any further partitioning. FIG. 3A illustrates an example of block partitioning structure according to the QTBT splitting structure and FIG. 3B illustrates a corresponding coding tree diagram for the QTBT splitting structure shown in FIG. 3A. Solid lines in FIGS. 3A and 3B indicate quadtree splitting while dashed lines indicate binary tree splitting. In each splitting node (i.e., non-leaf) of the binary-tree structure, one flag indicates which splitting type is used, 0 indicates horizontal symmetrical splitting and 1 indicates vertical symmetrical splitting. For CTUs coded in I-type slices, the QTBT coding tree representation for chroma CTBs may be different from the QTBT coding tree representation for a corresponding luma CTB. For CTUs coded in P-type and B-type slice, the same QTBT coding tree representation is applied to both chroma CTBs and luma CTB except when a certain minimum size is reached for a chroma block. In the QTBT splitting structure, the minimum allowed quadtree leaf node size, the maximum allowed binary tree root node size, the minimum allowed binary tree leaf node width and height, and the maximum allowed binary tree depth and height are indicated in the high level syntax such as in the SPS.

The QTBT splitting structure can be used for partitioning a block into multiple smaller blocks, for example, the QTBT splitting structure is used to partition a CTU into CUs, and the CUs are further processed by prediction and transform coding. In other words, a leaf node f the QTBT splitting structure is a basic unit for both prediction and transform coding. In one example, a size of a CTU is 128×128, a minimum allowed quadtree leaf node size is 16×16, a maximum allowed binary tree root node size is 64×64, minimum allowed binary tree leaf node width and height are both 4, and a maximum allowed binary tree depth is 4. Each CTU is partitioned by a quadtree splitting structure in this example, so a leaf quadtree unit may have a size ranging from 16×16, the minimum allowed quadtree leaf node size, to 128×128, the size of the CTU. If a leaf quadtree unit is 128×128, it cannot be further split by binary tree splitting since the size of the leaf quadtree unit exceeds the maximum allowed binary tree root node size 64×64; otherwise, the leaf quadtree unit with a size less than or equal to 64×64 can be further split by binary tree splitting. When splitting a leaf quadtree unit by binary tree splitting, this leaf quadtree unit is also the root binary tree unit, which has a binary tree depth equal to 0. When the binary tree depth reaches 4, the specified maximum depth, splitting is implicitly prohibited. Similarly, when a width or height of a binary tree node equal to 4, horizontal or vertical splitting is implicitly prohibited, respectively. The leaf nodes of the QTBT splitting structure are further processed by prediction and transform coding.

Intra prediction has been widely adopted in various image and video coding standard to process an initial picture or to periodically insert I-picture or I-blocks for random access or for alleviation of error propagation. Intra prediction is designed to exploit spatial features in the picture such as smooth area, vertical line or edge, horizontal line or edge, and diagonal line or edge within a picture or within a picture region. Intra prediction is also useful for regions with high motion or scene changes. For a block-based video coding standard, intra prediction for a current block is relied upon samples in neighboring blocks that have been processed. For example, if blocks in a picture or picture region are sequentially processed row by row from top to bottom and from left to right, neighboring blocks on the top and neighboring blocks on the left of the current block can be used to form an intra predictor for predicting samples in the current block.

Inter prediction, including Inter mode, Merge mode, and Skip mode, is designed to exploit temporal correlations between a current picture and one or more reference pictures. A motion vector is used to represent a displacement between a current block in a current picture and a corresponding reference block in a reference picture. A technique called Intra Block Copy (IBC) is very effective to encode screen contents by searching a similar pattern in the current picture. It is similar to the block matching process in inter prediction, a Block Vector (BV) is used to represent a displacement between a current block and a corresponding reference block in the current picture. The corresponding reference block is a previously reconstructed block within the same picture as the current block.

BRIEF SUMMARY OF THE INVENTION

Methods and apparatuses for processing video data with one or more constraints applied within each root block are disclosed. Embodiments of a video coding system implementing the methods receive input data associated with a current block in a current slice, determining whether one or more components of the current block satisfy one or more predefined criteria during partitioning, setting the current block to be a root block if the one or more components of the current block satisfy the predefined criteria, applying a mode constraint, a chroma split constraint, or both the mode and chroma split constraints to the current block if the current block is set to be a root block, adaptively splitting the current block into one or more blocks; and encoding or decoding the current block.

In some embodiments, the mode constraint restricts all blocks split from the current block to be processed by a same prediction mode when the current block is split into a plurality of blocks. The same prediction mode corresponds to all blocks within a root block are coded in inter prediction modes or non-inter prediction modes according to some embodiments, where the non-inter prediction modes include intra prediction modes or the non-inter prediction modes including intra prediction modes and an Intra Block Copy (IBC) mode. In another embodiment, the same prediction mode corresponds to all blocks within a root block are coded in inter prediction modes, intra prediction modes, or the IBC mode. In some other embodiments, the same prediction mode corresponds to all blocks within a root block are coded in intra prediction modes or non-intra prediction modes, where the non-intra prediction modes include inter prediction modes or the non-intra prediction modes including inter prediction modes and the IBC mode.

The one or more predefined criteria will not be checked in one or more blocks split from the current block if the current block is set as a root block. Examples of the predefined criteria are related to one or a combination of a size of the current block, a width of the current block, a height of the current block, a depth of the current block, an average depth of neighboring blocks of the current block, a splitting type for partitioning the current block, a size of one children block split from the current block, a width of one children block split from the current block, a height of one children block split from the current block, a depth of one children block split from the current block, and an average depth of neighboring blocks of one children block split from the current block. The size, area, width and height correspond to a luma sample size, a luma sample area, a luma sample width and a luma sample height, or a chroma sample size, a chroma sample area, a chroma sample width and a chroma sample height.

In some embodiments, the mode constraint is applied to all luma and chroma components of the current block, and in some other embodiments, the mode constraint is only applied to the luma component or the chroma components of the current block. In one embodiment, the mode constraint is only applied to root blocks in the current slice if share-tree partitioning is used in the current slice, and the mode constraint is not applied if dual-tree partitioning is used.

In some embodiments, a reference constraint is applied to any block within a root block encoded or decoded in an IBC mode when share-tree block partitioning is used to split luma and chroma components, dual-tree block partitioning is used to split luma and chroma components, or either share-tree block partitioning or dual-tree block partitioning is used to split the luma and chroma components. The reference constraint prohibits a reference block derived from a Block Vector (BV) of a block within the current block to overlap with the current block when the current block is set as a root block. In cases when a reference block derived from a BV of a block within the current block overlaps with the current block and the current block is set as a root block, the block within the current block is not encoded or decoded in an IBC mode according to one embodiment, the BV is extended in a horizontal direction, vertical direction, or both the horizontal and vertical directions according to some other embodiments, or overlapped samples in the reference block are replaced by padded samples according to another embodiment.

In one embodiment of implementing the mode constraint, one or more prediction mode syntax elements of each block in the current block are still signaled in a video bitstream at the encoder or parsed from the video bitstream at the decoder. For example, each block in the current block is a Coding Unit (CU). The prediction mode syntax elements of all blocks in the current block must correspond to the same prediction mode if the current block is set to be a root block. The same prediction mode used in the current block is also referred to as a constrained mode of the current block. In another embodiment of implementing the mode constraint, one or more prediction mode syntax elements of a first block in the current block according to the constrained mode of the current block are signaled in a video bitstream at the encoder or parsed from the video bitstream at the decoder while prediction modes of remaining blocks in the current block are not signaled or parsed if the current block is set to be a root block. Prediction modes of the remaining blocks within the current block are inferred to be the same prediction mode as that of the first block in the current block. In one embodiment, one or more prediction mode syntax elements of the remaining blocks in the current block are still signaled or parsed if the constrained mode is non-inter mode and the current block is set to be a root block.

In one embodiment, one or more components of the current block satisfy the one or more predefined criteria when a size of the current block is larger than a predefined threshold and a size of at least one split partition of the current block partitioned by ternary tree splitting is less than the predefined threshold, the mode constraint restricts all blocks within the current block to be processed by the same prediction mode or the mode constraint restricts all blocks within the split partition with a size less than the predefined threshold to be processed by the same prediction mode. In some embodiments of applying the chroma split constraint, a luma component of the current block is further partitioned into smaller blocks while chroma components of the current block are not allowed to be further partitioned when the current block is set to be a root block. Multiple luma blocks split from the current block correspond to one single chroma block in a corresponding root block, and this chroma block is encoded or decoded according to a reference luma block in the current block. Some examples of the reference luma block include a luma block in the current block covering a center position, a first luma block in the current block, a last luma block in the current block, a luma block with a largest area in the current block, a luma block covering one of four corners of the current block, a first intra coded luma block in the current block, a first inter coded luma block in the current block, a first IBC coded luma block in the current block, and a last IBC coded luma block in the root block. In an embodiment, a prediction mode of the chroma block in the corresponding root block is derived from a prediction mode of the reference luma block, and in another embodiment, inter prediction mode information of the chroma block in the corresponding root block is derived from inter prediction mode information of the reference luma block. When an IBC mode is enabled, a constraint is applied to restrict a BV of the reference luma block not causing a reference block for predicting the chroma block to overlap with the corresponding root block.

In some embodiments, the chroma split constraint is adaptively applied according to a prediction mode of the luma component, for example, the chroma components of the current block is not allowed to be further partitioned if the luma component of the current block is coded in intra or non-inter prediction mode, while the chroma components of the current block is allowed to be further partitioned if the luma component of the current block is coded in inter prediction mode. The chroma components of the current block follow partitioning of the luma component of the current block if the luma component is coded in inter prediction mode and the chroma components of the current block are not allowed to be further partitioned if the luma component is coded in intra or non-inter prediction mode. In one embodiment, a prediction mode of the chroma components of the current block is inferred to be intra prediction mode if the luma and chroma components of the current block have different partitioning structures in slices with share-tree partitioning.

In one embodiment of implementing one or both the mode constraint and chroma split constraint, one or more syntax elements of one or more luma blocks in the current block are first signaled or parsed, and then one or more syntax elements of one or more chroma blocks in the current block are signaled or parsed if the current block is set to be a root block and a constrained mode of the current block is non-inter prediction mode. In one embodiment of implementing one or both the mode constraint and chroma split constraint, one or more syntax elements of each block in the current block, including the luma component and chroma components, are signaled or parsed if the current block is set to be a root block and a constrained mode of the current block is inter prediction mode, where block partitioning of the chroma components follows the luma component in the current block.

Aspects of the disclosure further provide an apparatus in a video coding system for receiving input data associated with a current block, determining whether one or more components of the current block satisfies one or more predefined criteria during partitioning, setting the current block to be a root block if one or more components of the current block satisfies one or more predefined criteria, applying a mode constraint, a chroma split constraint, or both the mode and chroma split constraints to the current block only if the current block is set to be a root block, and encoding or decoding the current block. The mode constraint restricts all block split from the current block to be processed by a same prediction mode, for example, a constrained mode of the current block is inter prediction mode or non-inter prediction mode, and the chroma split constraint prohibits further partitioning chroma components of the current block according to the constrained mode of the root block.

Aspects of the disclosure further provide a non-transitory computer readable medium storing program instructions for causing a processing circuit of an apparatus to encode or decode video data by determining whether a current block is a root block and applying one or more constraints to the current block if it is a root block. Other aspects and features of the invention will become apparent to those with ordinary skill in the art upon review of the following descriptions of specific embodiments.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF THE INVENTION

Figure 1:
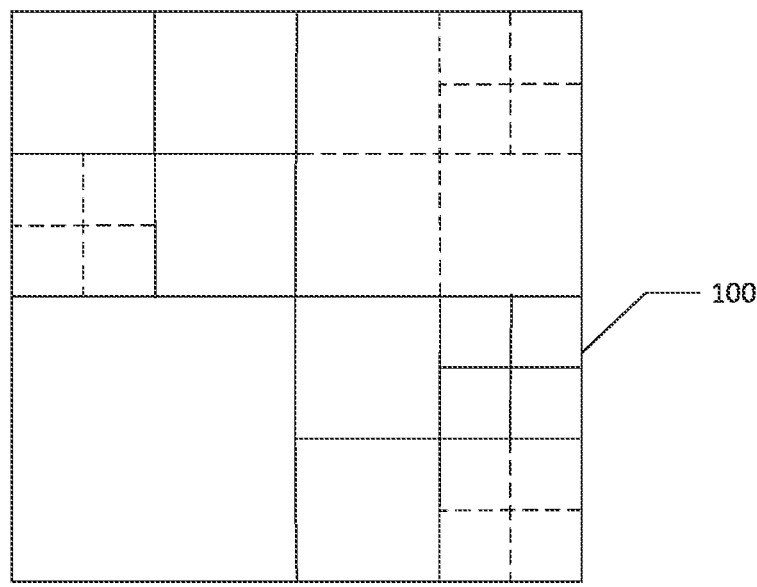
FIG. 1 illustrates an exemplary coding tree for splitting a Coding Tree Unit (CTU) into Coding Units (CUs) and splitting each CU into one or more Transform Units (TUs) according to quadtree splitting defined in the HEVC standard.
Figure 2:
FIG. 2 illustrates eight different Prediction Unit (PU) partition types for splitting a CU into one or more PUs according to the HEVC standard.
Figure 2:
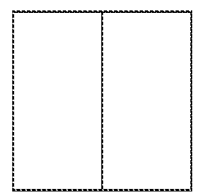
Figure 2:
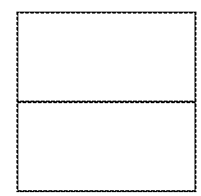
Figure 2:
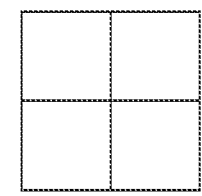
Figure 2:
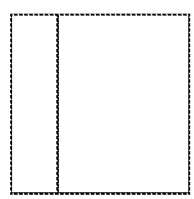
Figure 2:
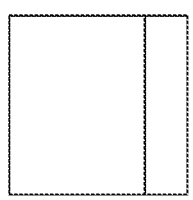
Figure 2:
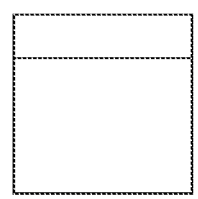
Figure 2:
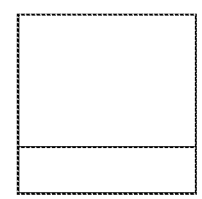
Figure 3A:
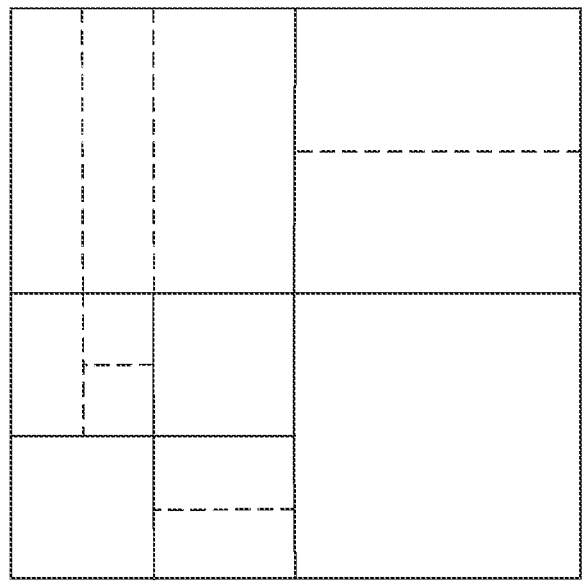
FIG. 3A illustrates an exemplary block partitioning structure according to a QuadTree plus Binary Tree (QTBT) splitting structure.
Figure 3B:
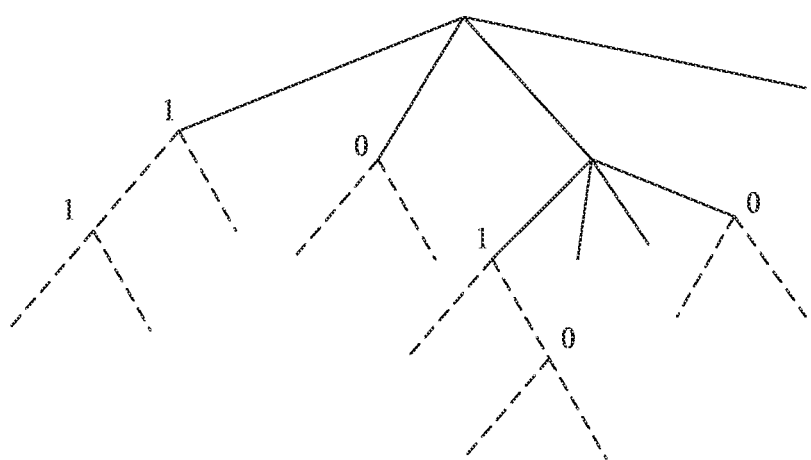
FIG. 3B illustrates a coding tree structure corresponding to the QTBT splitting structure of FIG. 3A.

It will be readily understood that various modules of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention.

Reference throughout this specification to "an embodiment", "some embodiments", or similar language means that a particular feature, structure, or characteristic described in connection with the embodiments may be included in at least one embodiment of the present invention. Thus, appearances of the phrases "in an embodiment" or "in some embodiments" in various places throughout this specification are not necessarily all referring to the same embodiment, these embodiments can be implemented individually or in conjunction with one or more other embodiments. Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention. In the following, a slice is a representative unit which can be replaced by a tile, a tile group, or a picture of video data.

Neighboring reconstructed samples of a current block in the same slice are used as reference samples for predicting the current block coded in intra prediction. The processing throughput may be restricted by the smallest intra coded block size because the processor can only predict at most the entire current block at once when the current block is processed by intra prediction. Parallel processing for multiple intra coded blocks is not feasible as prediction for each of these intra coded blocks cannot be conducted until corresponding neighboring reconstructed samples are available. The coding performance may be significantly improved when regions in a video slice containing complex textures can be partitioned into small blocks and separately predicted, however, the processing throughput will be degraded when processing these small blocks by intra prediction. Various embodiments of the present invention may improve the processing throughput by setting a root block for employing one or more constraints within the root block.

Setting Root Block In some embodiments, a root block is defined according to one or more predefined criteria. A current block is checked with one or more predefined criteria during partitioning (or called splitting), and if the current block satisfies the predefined criteria, it is set to be a root block. In some embodiments, a restriction for defining root blocks limits all root blocks to be completely within a frame boundary, so each root block is not allowed to exceed the frame boundary. A top-left position of a root block is represented by sharedRootPos, a width of the root block is represented by sharedRootWidth, and a height of the root block is represented by sharedRootHeight. For example, in cases when a current block satisfies one or more predefined criteria and a root block has not been set, the current block is set to be a root block and the top-left position of a root block sharedRootPos is set to be a top-left position of the current block, the width of the root block sharedRootWidth and the height of the root block sharedRootHeight are set to be equal to width and height of the current block. The current block may be further partitioned (or called adaptively split) into multiple blocks, and once the current block is set as a root block, the one or more blocks split from the current block will not be checked with the same predefined criteria.

One of the predefined criteria is related to a size or area of the current block according to some embodiments, and the current block satisfies the predefined criterion if the size of the current block is less than, equal to, or less than or equal to a predefined threshold. The size and area correspond to a luma sample size and a luma sample area, or a chroma sample size and a chroma sample area. Some examples of the predefined threshold can be 4, 8, 16, 32, 64, 128, 256, 512, 1024, 2048, or 4096 luma or chroma samples. For example, when the predefined threshold for a luma component is 64 luma samples, a current block with a size equal to 64 luma samples satisfies the predefined criterion and is set to be a root block. In this example, the predefined threshold for chroma components is 16 chroma samples, and a current block with a size equal to 16 chroma samples satisfies the predefined criterion and is set to be a root block.

In some embodiments, one of the predefined criteria is related to a width and/or height of the current block. For example, the current block satisfies the predefined criterion if the width is less than, equal to, or less than or equal to a predefined threshold, where the predefined threshold can be 2, 4, 8, 16, 32, 64, or 128 luma or chroma samples. In another example, the current block satisfies the predefined criterion if the height is less than, equal to, or less than or equal to a predefined threshold, where the predefined threshold can be 2, 4, 8, 16, 32, 64, or 128 luma or chroma samples. In one example of the predefined criteria relating to both the width and height, the current block satisfies the predefined criteria if both the width and height are less than, equal to, or less than or equal to a predefined threshold, where the predefined threshold can be 2, 4, 8, 16, 32, 64, or 128 luma or chroma samples. In another example of the predefined criteria relating to both the width and height, the current block satisfies the predefined criteria if the width is less than, equal to, or less than or equal to a predefined threshold A, and if the height is less than, equal to, or less than or equal to a predefined threshold B. Some examples of the predefined threshold A or predefined threshold B are 2, 4, 8, 16, 32, 64, and 128 luma or chroma samples, and a combination of the predefined thresholds A and B can be any combination of the above examples. The width and height correspond to a luma sample width and a luma sample height, or a chroma sample width and a chroma sample height.

In some other embodiments, one of the predefined criteria is related to a depth of the current block, for example, the depth is a QuadTree (QT) depth, Binary Tree (BT) depth, Multi Tree (MT) depth or a linear combination of the above depths. For example, the current block satisfies the predefined criterion when the QT depth, MT depth, or both the QT and MT depth of the current block is larger than, equal to, or larger than or equal to a predefined threshold. The predefined threshold can be 1, 2, 3, 4, or 5. In one embodiment, the current block satisfies one predefined criterion if a weighted depth of the current block is larger than, equal to, or larger than or equal to a predefined threshold. Some examples of the weighted depth are calculated from both QT depth and MT depth. In one example, the weighted depth is calculated by (A*QT depth+(2^B−A)*MT depth>>B), and in another example, the weighted depth is equal to 2*QT depth+MT depth.

An embodiment of a predefined criterion is related to depth information of neighboring blocks of the current block, and the current block satisfies the predefined criterion by comparing the depth information of the neighboring block with one or more predefined thresholds. For example, the depth information includes a QT depth, MT depth, average QT depth, or average MT depth, and the current block satisfies the predefined criterion if the average QT depth or average MT depth of the neighboring blocks of the current block is larger than a predefined threshold, where the predefined threshold can be 1, 2, 3, 4, or 5.

In some embodiments, a current block satisfies one of the predefined criteria by comparing a predefined threshold with one children block split from the current block. The current block is set as a root block if the current block satisfies a predefined criterion according to one children block split from the current block. An embodiment of the predefined criterion is related to a size or area of one children block, for example, a current block is set as a root block if a size of one children block split from the current block is less than, equal to, or less than or equal to a predefined threshold. Some other embodiments of the predefined criterion is related to a width, height, both the width and height, a depth, an average depth of neighboring blocks of one children block partitioned from the current block. The size and area correspond to a luma sample size and a luma sample area, or a chroma sample size and a chroma sample area.

In some exemplary embodiments, multiple criteria are checked to determine whether a current block is a root block. Embodiment of engaging multiple criteria checking sets a current block as a root block if the current block satisfies criteria A and one children block split from the current block satisfies criterion B. In one embodiment, a current block is a root block if a size of the current block satisfies criterion A and a size of one children block split from the current block satisfies criterion B. For example, a current block is set as a root block if a size of the current block is less than or equal to a predefined threshold and a size of at least one children block is less than or equal to another predefined threshold. In some alternative examples, a current block is set as a root block if a size of the current block is equal to a predefined threshold and a size of at least one children block is equal to another predefined threshold, or a current block is set as a root block if a size of the current block is less than a predefined threshold and a size of at least one children block is less than another predefined threshold. The predefined threshold for the size may be 4, 8, 16, 32, 64, 128, 256, 512, 1024, 2048, or 4096 luma or chroma samples. The size corresponds to a luma sample size or a chroma sample size.

In another embodiment, a current block is set as a root block if a width of the current block is larger than, equal to, or larger than or equal to a predefined threshold and a width of at least one children block is less than, or equal to, or less than or equal to another predefined threshold, where each of the predefined thresholds for the width may be 2, 4, 8, 16, 32, 64, or 128 luma or chroma samples. In another embodiment, a current block is set as a root block if a height of the current block is equal to a predefined threshold and a height of any children block is less than another predefined threshold. In yet another embodiment, a current block is set as a root block if width and height of the current block satisfies criteria A and B and width and height of one children block in the current block satisfies criteria C and D. The width and height correspond to a luma sample width and a luma sample height, or a chroma sample width and a chroma sample height. Sizes of a current block and children blocks partitioned from the current block may be represented by depths, so in some embodiments, the current block is set as a root block during partitioning if a QT depth or MT depth of the current block is less than or equal to a predefined threshold and a QT depth or MT depth of at least one children block is larger than or equal to another predefined threshold. In one embodiment, a current block is set as a root block if a first average depth calculated by both QT depth and MT depth of the current block is equal to a predefined threshold and a second average depth calculated by QT depth and MT depth of any children block is equal to another predefined threshold. In another embodiment, a current block is set as a root block if an average neighboring QT depth or MT depth of the current block is less than or equal to a predefined threshold and an average neighboring QT depth or MT depth of at least one children block is larger than or equal to another predefined threshold. The predefined threshold for the depth may be 1, 2, 3, 4, or 5.

In some other embodiments, a current block is set as a root block if the current block satisfies criterion A and its parent block satisfies criterion B. For example, a current block is set as a root block if a size of the current block is less than or equal to a first threshold and a size of its parent block is larger than a second threshold, where the first or second threshold may be 4, 8, 16, 32, 64, 128, 256, 512, 1024, 2048, or 4096 luma or chroma samples. In another embodiment, a current block is set to be a root block if a width of the current block is less than or equal to a predefined threshold and a width of a parent block of the current block is larger than another predefined threshold, where the predefined thresholds may be 4, 8, 16, 32, 64, or 128 luma or chroma samples. The size corresponds to a luma sample size or a chroma sample size.

In some embodiments of engaging multiple criteria checking, a current block is set as a root block if the current block satisfies two or more criteria. In an embodiment of applying multiple criteria checking, a current block is set as a root block if a size of the current block satisfies criterion A and partitioning of the current block satisfies criterion B. For example, beside checking the size of the current block with criterion A, a split flag for partitioning the current block or a splitting type applied to the current block is checked with criterion B, and the current block is set as a root block if both criteria are satisfied. Once the root block is set, the multiple criteria checking will not be applied to the one or more children blocks in the current block. The split flag may indicate whether a particular splitting type is used to partition the current block, for example, a quadtree partitioning is applied to partition the current block if the split flag is true. Some examples of the splitting type are quadtree partitioning, horizontal binary tree partitioning, vertical binary tree partitioning, horizontal ternary tree partitioning, and vertical ternary tree partitioning.

In some embodiments, the predefined criteria are related to one or a combination of a size of the current block, a width of the current block, a height of the current block, a depth of the current block, an average depth of neighboring blocks of the current block, a splitting type for partitioning the current block, a size of one children block split from the current block, a width of one children block split from the current block, a height of one children block split from the current block, a depth of one children block split from the current block, and an average depth of neighboring blocks of one children block split from the current block. The size, width, and height correspond to a luma sample size, a luma sample width, and a luma sample height, or a chroma sample size, a chroma sample width, and a chroma sample height. Some embodiments of the processing method further check if one children block split from the current block satisfies one or more second criteria, and the current block is set to be a root block if the current block satisfies the one or more predefined criteria and the children block satisfies the one or more second criteria. For example, the one or more second criteria are related to a size, width, height, both width and height, or depth of the children block split from the current block. All other children blocks split from the current block are not checked with the one or more predefined criteria checked with the current block and the one or more second criteria if the current block is set to be a root block.

Conditionally Apply Root Block Constraint The method of defining root blocks during partitioning and applying one or more constraints to the root blocks is employed when processing both luma and chroma components of the root blocks according to one embodiment, and in some other embodiments, the method of defining root blocks and applying one or more constraints is only employed when processing the luma component of the root blocks or the chroma components of the root blocks. In some embodiments, a flag in a current tile, slice, picture, tile group, or video sequence is used to indicate whether the encoder or decoder needs to determine root blocks in the current tile, slice, picture, tile group, or video sequence, and if the flag is true, the encoder or decoder determines root blocks and the processes video data according to one or more constraints. In one embodiment, this flag indicates whether the current slice is coded using dual-tree partitioning or not, for example, the encoder or decoder determines root blocks and processes video data according to one or more constraints when the flag indicates the current slice is not coded using dual-tree partitioning. In one embodiment, this flag is set to be false, indicating the constraints within root blocks are not applied, in sequences with a resolution less than 1080P.

Reference Constraint within Root Block Coded in Intra Mode In some embodiments, if a root block exists and one or more blocks in the root block are coded in intra prediction mode, reference samples are shared for these intra coded blocks within the root block. For blocks within the root block, a sample reconstruction process, such as a predictor generation process, disallow using samples within the root block. The samples may refer to prediction samples or reconstruction samples. The sample reconstruction process uses boundary samples of the root block as reference samples for processing all blocks within the root block. For example, reference samples for generating predictors for coding one or more blocks in a root block in normal intra prediction modes, Linear Model (LM) mode for predicting chroma from luma, or intra inter mode are derived according to neighboring reconstructed samples of the root block. For a current block not within a root block, reference samples used for generating an intra predictor for the current block are derived from neighboring reconstructed samples of the current block.

In one embodiment, a root block corresponds to a current block is defined for deriving Most Probable Modes (MPMs) for encoding or decoding the current block by intra prediction. According to the HEVC standard, the MPMs of each block inside the current block are derived by referencing intra prediction modes of above and left neighboring blocks of each block in the current block, where the above or left neighboring block may also be within the current block. In this embodiment of employing a reference constraint within root blocks, MPMs of each block inside a current block are derived from intra prediction modes of above and left neighboring block of the current block if the current block is set to be a root block. Intra prediction modes of neighboring blocks within the same root block cannot be used for MPM derivation. In this embodiment, a position of the root block is used for MPM derivation for all blocks within the root block.

Reference Constraint for Blocks Coded in Intra Block Copy Mode In one embodiment of applying the concept of root blocks, in both share-tree and separate-tree (or so called dual-tree) block partitioning, a reference block derived from a Block Vector (BV) of an Intra Block Copy (IBC) coded block within a root block cannot overlap with the root block. Block partition structures for splitting luma and chroma components are the same when share-tree block partitioning is employed, whereas luma and chroma components have separate block partition structures when dual-tree block partitioning is employed to split the video data. In another embodiment, only in share-tree block partitioning, a reference block derived from a BV of an IBC coded block cannot overlap with the root block. In yet another embodiment, only in dual-tree block partitioning, a reference block derived from a BV of an IBC coded block cannot overlap with the root block.

In cases when a derived BV of a current block causes a reference block overlapping with the corresponding root block, in one embodiment, the current block cannot use IBC mode. The current block is either a chroma block in dual-tree block partitioning or both chroma and luma blocks in share-tree block partitioning. In another embodiment, a derived BV is extended in a horizontal direction, vertical direction, or both the horizontal and vertical directions to cause a reference block not overlapping with the corresponding root block. In one embodiment, the extended direction depends on a width and height of the overlapped region, if the width is larger than or equal to the height, then the BV is extended in the vertical direction, otherwise, the BV is extended in the horizontal direction. In another embodiment, in dual-tree block partitioning, share-tree block partitioning, or both dual-tree and share-tree block partitioning, samples of a reference block that overlaps with the corresponding root block are replaced by padded samples if the reference block overlaps with the corresponding root block. In one embodiment, an IBC Merge candidate can only be used if the position located by the BV is outside the root block. In another embodiment, the IBC Merge candidate derivation for a current block within a root block locates neighboring blocks using a boundary of the root block instead of the current block.

Mode Constraint within Root Block In some embodiments of the present invention, when a root block is set in an inter slice or in a slice not coded in dual-tree partitioning, all blocks within the root block must be coded in the same prediction mode. In one embodiment, all blocks within a root block are coded in inter prediction modes, or all the blocks within the root block are coded in non-inter prediction modes. An example of the non-inter prediction modes are various intra prediction modes, and another example of the non-inter prediction modes include various intra prediction modes and IBC modes. In an alternative embodiment, all blocks within a root block are coded in inter prediction modes, intra prediction modes, or IBC mode. In another alternative embodiment, all blocks within a root block are coded in intra prediction modes, or non-intra prediction modes. For example, the non-intra prediction modes include various inter prediction modes such as Advanced Motion Vector Prediction (AMVP) mode, Merge mode, Skip mode; or the non-intra prediction modes include various inter prediction modes and IBC mode.

In one embodiment, when share-tree block partitioning, or so called single-tree block partitioning, is employed to split luma and chroma components of video data, a luma root block can be further partitioned into smaller blocks and the partition of the corresponding chroma root block follows partitioning of the luma root block. For chroma blocks coded in intra prediction modes within a root block, these chroma blocks use top and left boundaries of the root block to generate intra predictors, which results in less data dependency between successive chroma blocks. In one embodiment, for these chroma CUs within a root block, one TU is used to process residues of all children CUs.

In one embodiment of processing video data in an inter slice or in a slice not coded in dual-tree partitioning, when a current block is set as a root block, and all children blocks split from the current block are constrained to be encoded or decoded in non-inter prediction modes, a reference constraint is applied to any children block encoded or decoded in an IBC mode when share-tree block partitioning is used to split luma and chroma components. In another embodiment, the reference constraint is applied to IBC coded blocks when dual-tree block partitioning is used to split luma and chroma components. In yet another embodiment, the reference constraint is applied to IBC coded blocks when either share-tree block partitioning or dual-tree block partitioning is used to split luma and chroma components. The reference constraint prohibits a reference block derived from a BV of any children block within the root block to overlap with the root block. In one embodiment, if a derived chroma BV of a chroma block makes a reference chroma block overlaps with a corresponding chroma root block in dual-tree block partitioning, this particular chroma block cannot be encoded or decoded in the IBC mode. In another embodiment, if a derived chroma BV of a chroma block makes a reference chroma block overlaps with a corresponding chroma root block in dual-tree block partitioning, share-tree block partitioning, or both dual-tree and share-tree block partitioning, the derived chroma BV is extended in a horizontal direction, vertical direction, or both the horizontal and vertical directions to make the reference chroma block not overlapping with the corresponding chroma root block. In yet another embodiment, in dual-tree block partitioning, share tree-block partitioning, or both dual-tree and share-tree block partitioning, samples of the reference chroma block that overlap with the corresponding chroma root block are replaced by padded samples.

Embodiments of the mode constraint restrict all children CUs within a root block to be coded in the same prediction mode. In the following embodiments, for the ease of illustration, the same prediction mode is referred to as all children CUs within a root block are processed by either inter prediction or non-inter prediction. Various inter prediction modes such as AMVP mode, Merge mode, and Skip mode are all belong to inter prediction modes. Intra prediction modes and IBC mode are considered to be the same prediction mode, the non-inter prediction modes. In one embodiment of implementing the mode constraint, one or more prediction mode syntax elements of each CU are still signaled in an encoder or parsed in a decoder, however, all the prediction mode syntax elements of CUs belong to the same root block must all indicate the same prediction mode, that is either all the CUs are coded by inter prediction or all the CUs are coded by non-inter prediction. It is a bitstream conformance that the prediction mode syntax elements of all CUs within the root block must correspond to the same prediction mode in this embodiment. In another embodiment of implementing the mode constraint, one or more prediction mode syntax elements of a first CU in the root block are signaled in an encoder or parsed in a decoder, and one or more prediction mode syntax elements of remaining CUs in the root block are not signaled or parsed as the prediction modes of the remaining CUs are inferred to be the same as the prediction mode of the first CU. In one example, a skip flag and related syntax elements are only signaled for CUs coded in an inter prediction mode, while a skip mode is inferred as false for CUs inferred as non-inter coded CUs. In another embodiment of implementing the mode constraint, one or more prediction mode syntax elements of a first CU in the root block are signaled in an encoder or parsed in a decoder, and one or more prediction mode syntax elements of remaining CUs in the root block are signaled or parsed only if the constrained mode is non-inter prediction mode.

In the following embodiments, syntax signaling for blocks within a root block may be understood as syntax signaling for CUs within the root block. In one embodiment, signaling of blocks within a non-inter coded root block is from the luma component to chroma components. First, syntax elements associated with mode information of all the luma blocks in the root block are signaled, and then syntax elements associated with coefficient information of all the luma blocks in the root block are signaled. Second, syntax elements associated with mode information (if necessary) of all the chroma blocks in the root block are signaled, then syntax elements associated with coefficient information of the chroma blocks are signaled. In another embodiment, signaling of blocks within a root block (for example, a non-inter coded root block) is from the luma component to chroma components. First, syntax elements associated with mode information and residual of each luma block in the root block are signaled. Second, syntax elements associated with mode information (if necessary) and residual of each chroma block in the root block are signaled. In another embodiment, signaling of blocks within a root block (for example, a non-inter coded root block) is from prediction information to coefficient information. First, syntax elements associated with mode information of all the luma blocks in the root block are signaled, then syntax elements associated with mode information of all the chroma blocks in the root block are signaled (if necessary). Second, syntax elements associated with coefficient information of all the luma blocks in the root block are signaled, then syntax elements associated with coefficient information of the chroma blocks in the root block are signaled. In another embodiment, within a root block, if all luma blocks in the root block are coded in inter mode and chroma component block partitioning follows luma component block partitioning, the syntax signaling order is signaling the information of a luma block and its corresponding chroma block, then signaling the information of a next luma block and its corresponding chroma block. The syntax elements of each block in the root block, including the luma component and the chroma components, are sequentially signaled by the encoder or parsed by the decoder when all the blocks are coded in inter prediction mode and block partitioning of the chroma components follows block partitioning of the luma component. Otherwise, when not all luma blocks are inter coded blocks, one of the above syntax signaling methods is applied.

Special Cases of Ternary Splitting for Applying Mode Constraint In some specific embodiments of applying the mode constraint, a current block is set as a root block when the current block has a size larger than a predefined threshold and a size of at least one split partition of the current block is less than the predefined threshold, where the split partition is partitioned from the current block by ternary tree splitting. In one embodiment, all blocks split from the current block are restricted to be processed by the same prediction mode when the current block is set as a root block. In another embodiment, all blocks within a split partition with a size less than the predefined threshold are constrained to be coded in the same prediction mode, and the mode constraint is not applied to the split partition with a size equal to the predefined threshold. In one embodiment, the size of a root block is fixed to be equal to a predefined threshold and the size of a root block can be larger than the predefined threshold only when the root block is partitioned by ternary splitting and at least one split partition within the root block is less than the predefined threshold. The size corresponds to a luma sample size or a chroma sample size.

An embodiment of applying the mode constraint to a root block partitioned by ternary tree splitting is described in the following considering three different cases. In case 1, the same prediction mode means all blocks within a root block must be coded in intra prediction modes, inter prediction modes, or IBC mode. In case 2, the same prediction mode means all blocks within a root block must be coded in intra prediction modes or non-intra prediction modes, where the non-intra prediction modes include inter prediction and IBC modes. In case 3, the same prediction mode means all blocks within a root block must be coded in inter prediction modes or non-inter prediction modes, where the non-inter prediction modes include intra prediction and IBC modes. If the prediction mode of all blocks within the split partition with sizes less than the predefined threshold is intra prediction mode for case 1, intra prediction mode for case 2, or intra prediction or IBC mode for case 3, respectively, then all blocks within the root block must be coded in intra prediction mode for case 1, intra prediction mode for case 2, or intra prediction or IBC mode for case 3 respectively. If the prediction mode of all blocks within the split partition with sizes less than the predefined threshold is inter prediction mode for case 1, inter prediction or IBC mode for case 2, or inter prediction mode for case 3, respectively, then blocks within the split partition with a size equal to the predefined threshold can be all the same. The root block is reset to be the split partition with a size equal to the predefined threshold. For example, if a predefined threshold is equal to 64 luma samples, and a 128-luma-sample-region is further split by ternary splitting, then this 128-luma-sample-region is set to be a root block since one of the split partitions has a size less than 64 luma samples. The prediction mode of blocks within the first and third partitions must be the same. If the prediction modes of the blocks within the first and third partitions are all equal to intra prediction mode for case 1, intra prediction mode for case 2, or intra prediction or IBC mode for case 3, respectively, then all blocks within the second partition must also be coded in intra prediction mode for case 1, intra prediction mode for case 2, or intra prediction or IBC mode for case 3 respectively. If the prediction modes of the blocks within the first and third partitions are all equal to inter prediction mode for case 1, intra prediction or IBC mode for case 2, or inter prediction mode for case 3, respectively, then all blocks within the second partition can be coded in intra prediction, inter prediction, or IBC mode for case 1, intra prediction mode for case 2, or inter prediction or IBC mode for case 3 respectively. The second split partition is then set to be a root block.

In another embodiment, if a size of a root block is larger than a predefined threshold and is partitioned into three split partitions by ternary tree splitting, all blocks within a split partition with a size less than the predefined threshold must be inter prediction mode for case 1, inter prediction or IBC mode for case 2, or inter prediction mode for case 3 respectively. All blocks within a split partition with a size equal to the predefined threshold must be coded in the same mode. The root block is reset to be the split partition with a size equal to the predefined threshold.

Figure 4:
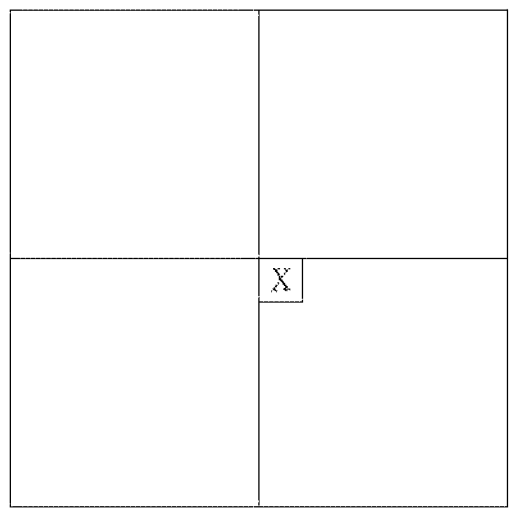
FIG. 4 illustrates an example of a center block located in a root block.

Chroma Split Constraint within Root Block In cases when luma and chroma components are partitioned using share-tree block partitioning, for example, in inter slice or I-slice with share-tree block partitioning, a small luma intra block such as a 4×4 block corresponds to smaller chroma intra blocks such as two 2×2 blocks in 4:2:0 color format, and if these 2×2 chroma blocks are coded in intra prediction, each 2×2 chroma block requires reconstructed neighboring samples during prediction. The purpose of applying a chroma split constraint is to avoid small chroma intra blocks or to reduce data dependency between successive chroma intra blocks. In some embodiments of the chroma split constraint, a root block is determined according to one or more predefined criteria, and a luma component of this root block is allowed to be further partitioned into smaller blocks, however, chroma components of this root block are not allowed to be further partitioned. In cases when the luma component of a root block is split, multiple luma blocks in the root block correspond to only one chroma block in a corresponding chroma root block. Each chroma block may be encoded or decoded according to a reference luma block, for example, a chroma block coded with a Linear Model (LM) mode is predicted from the reference luma block by a linear model, and parameters of the linear model are derived by reconstructed neighboring samples of the reference luma block. In this embodiment, a chroma block in a root block may correspond to multiple luma blocks, a reference luma block for encoding or decoding the chroma block may be determined according to one of the following methods. The reference luma block for encoding or decoding the chroma block is a luma block in the root block covering a center position, for example a bottom-right center as shown in FIG. 4. In some other methods of determining the reference luma block for the chroma block, the reference luma block for encoding or decoding the chroma block is a first luma block in the root block, a last luma block in the root block, a luma block with the largest or smallest area in the root block, or a luma block covering one of the four corners (i.e. the top-right, bottom-left, top-left, or bottom-right position) of the root block. For methods which select the luma block with the largest or smallest area in the root block, if there are more than one luma partition whose size is equal to the largest or smallest partition, then the luma partition with the smallest processing order index is selected. The luma partition with the largest processing order index is selected if there are more than one luma partition whose size is equal to the largest or smallest partition according to some other methods. The reference luma block for encoding or decoding the chroma block is a first intra coded luma block in the root block or a first inter coded luma block in the root block according to some other methods. If the IBC mode is enabled, the reference luma block for encoding or decoding the chroma block may be a first IBC coded luma block in the root block, a last IBC coded luma block in the root block, or a luma block with a predefined position, such as a center position, in the root block. Only one intra prediction mode is signaled for this chroma root block.

The chroma split constraint which disallows splitting chroma components of a root block is applied to all blocks defined to be a root block according to an embodiment, and in another embodiment, the chroma split constraint is conditionally applied to blocks defined as root blocks. In some preferred embodiment, the chroma split constraint is conditionally applied to a current block defined as a root block according to a prediction mode of the current root block. In one exemplary embodiment, the chroma split constraint is applied to intra coded or non-inter coded root blocks, and the chroma split constraint is not applied to inter coded root blocks. In another embodiment, the chroma split constraint is applied to both intra and IBC coded root blocks but not to inter coded root blocks. In one embodiment, when chroma and luma components of a current root block have different block partitioning structures in share-tree block partitioning, a prediction mode of the chroma components of the current block is inferred to be intra prediction. In other words, when multiple luma blocks correspond to a single non-split chroma block in share-tree block partitioning, a prediction mode of the non-split chroma block is inferred to be intra prediction.

In the following embodiments, a prediction mode of a chroma block in a root block is the same as or derived from a prediction mode of a reference luma block. In one embodiment, a reference luma block in a root block is determined for encoding or decoding a chroma block in a corresponding chroma root block, an intra prediction mode of the reference luma block is used to derive an intra prediction mode of the chroma block. For example, the intra prediction mode of the chroma block is the same as the intra prediction mode of the reference luma block if the chroma block is coded in Direct Mode (DM). In another embodiment, if the reference luma block is an intra predicted block, the intra prediction mode of the chroma block is a predefined mode. For example, if the reference luma block is coded in intra prediction, the chroma block is treated as non-ISP (Intra Sub-partition Prediction) mode. In another embodiment, a reference luma block in a root block is determined for encoding or decoding a chroma block in a corresponding chroma root block, and if the reference luma block is an inter coded block, a Motion Vector (MV) of the chroma block is derived from the MV of the reference luma block. In one embodiment, a prediction mode of a chroma block in a root block can be different from a prediction mode of its reference luma block by explicitly signaling the prediction mode of the chroma block. In one embodiment, if the selected corresponding luma CU is coded in inter prediction mode, no additional syntax is required for chroma CU except the residual syntaxes. If the selected corresponding luma CU is coded in intra prediction mode, the chroma intra prediction mode is signaled.

In another embodiment, a weighted average luma MV of corresponding luma CUs in a root block is used for encoding or decoding a chroma CU in the corresponding chroma root block. The weights for the luma CUs can be the same or depend on areas of the luma CUs. In one example, if a corresponding luma CU is coded using a sub-block mode, such as Advanced Temporal Motion Vector Prediction (ATMVP) mode, affine mode, or MV Planar mode, the chroma CU also uses the same sub-block mode but with a larger CU size. In another example, the chroma MV is explicitly signaled.

In the following embodiments, luma blocks within a root block are coded in different prediction modes, such as inter prediction mode and intra prediction mode, and since corresponding chroma component of this root block cannot be further partitioned, the multiple luma blocks within the root block correspond to a single chroma block in a corresponding chroma root block. In one embodiment, a prediction mode of the chroma block can be explicitly signaled so it can be different from prediction modes of the luma blocks within the root block. In another embodiment, if Direct Mode (DM) is used to encode or decode the chroma block, one of luma intra prediction modes of the corresponding luma blocks in the root block is used as the intra prediction mode of the chroma block. The chosen luma block is referred to as a reference luma block, and the reference luma block is one of the four corner luma blocks or a center block according to a predefined rule. For example, a center block is located at a bottom-right-center of the root block as shown in FIG. 4. Only one intra prediction mode is signaled for the chroma block in the root block. In cases when the chroma block is coded in DM mode but a reference luma block is coded in inter prediction mode, an intra prediction mode of the chroma block is set to a predefined value, such as DC mode or Planar mode. In some other embodiments, a prediction mode of the chroma block in the corresponding chroma root block is derived according to one or more constraints. In one embodiment, the chroma block in the corresponding chroma root block is coded in Combined Intra Inter Prediction (CIIP) mode when there are intra coded luma blocks and inter coded luma blocks in the root block. In another embodiment, the chroma block in the corresponding chroma root block can only be coded in inter prediction mode when there are intra coded and inter coded luma blocks in the root block, so a reference luma block selected from the intra coded and inter coded luma blocks within the root block must be an inter coded block. For example, the inter prediction mode information of the chroma block can be inherited from an inter prediction mode of a first luma inter coded block, a last luma inter coded block, or a luma inter coded block with a largest area in the root block. In another embodiment, if a reference luma block determined by a predefined rule is an intra coded block and there are intra coded and inter coded luma blocks in the root block, Linear Model (LM) mode is not allowed to be used to encode or decode the chroma block. In another example, if the size of a root block is equal to 64 luma samples, and the luma component is further split by QT splitting, the resulting four 4×4 luma partitions can be coded with the same prediction mode or different prediction modes. The chroma component cannot be further split, which results in that there is only one chroma block with a size equal to 16 chroma samples. The chroma block's prediction mode can be inherited from a first luma block, a last luma partition, or a luma partition covering the center position (i.e. the forth partition) of the luma root block. If the selected luma block is coded in inter prediction mode, then the corresponding motion information will be inherited. If the selected luma block is coded in intra prediction mode, the prediction mode of the chroma block can be DM mode, and the DM mode can be derived according to one pre-defined position in the root block. In one embodiment, the DM mode of each chroma block is derived from a center CU of the root block (e.g. the BR-C block in FIG. 6). In another embodiment, the DM mode of each chroma block is derived from a top-left CU of the root block. In another embodiment, the DM mode of each chroma block is derived from a first or last CU of the root block. In another embodiment, the DM mode of each chroma block is derived from a first intra-coded CU of the root block. In another embodiment, its prediction mode can be explicitly signaled and can be different from the luma block. In yet another example, if the size of a root block is equal to 128 luma samples (for example, 8×16), and the luma component is further split by ternary-tree splitting, the resulting two 4×8 luma partitions and one 8×8 luma partition can be coded with the same prediction mode or different prediction modes. The chroma component cannot be further split, which results in that there is only one chroma block with a size equal to 32 chroma samples. The chroma block's prediction mode can be inherited from a first luma block, a last luma partition, a luma partition covering the center position (i.e. the second partition), or a luma partition with a largest size (i.e. the second partition) of the chroma root block. If the selected luma block is inter predicted, the corresponding motion information of the luma block will be inherited. If the selected luma block is intra predicted, the prediction mode of the chroma block can be DM mode, and the DM mode can be derived according to one pre-defined position in the luma root block. In one embodiment, the DM mode of each chroma block is derived from a center CU of the root block (e.g. the BR-C block in FIG. 4[DC(2)]). In another embodiment, the DM mode of each chroma block is derived from a top-left CU of the root block. In another embodiment, the DM mode of each chroma block is derived from a first or last CU of the root block. In another embodiment, the DM mode of each chroma block is derived from a first intra-coded CU of the root block. In another embodiment, its prediction mode can be explicitly signaled and can be different from the luma block.

A reference constraint may be applied for encoding or decoding a chroma block in a chroma root block according to a reference luma block when the Intra Block Copy (IBC) mode is enabled. In one embodiment, only an IBC coded luma block with a BV that will not cause a reference block for the chroma block overlapping with the chroma root block can be chosen as the reference luma block. In another embodiment, only an IBC coded luma block with a BV that will not cause reference blocks for the luma and chroma blocks overlapping with corresponding luma and chroma root blocks can be chosen as the reference luma block. In some embodiments, if a reference luma block selected by a predefined rule for encoding or decoding a chroma block is an IBC coded block with a luma BV, a reference block derived by the luma BV cannot overlap with the root block. For example, if the reference luma block is an IBC coded block with a luma BV which causes a derived reference block overlapping with the root block, the luma BV is extended. In another example, if the reference luma block is an IBC coded block with a luma BV which causes a derived reference block overlapping with the root block, only a chroma BV derived from the luma BV is extended.

Combining Mode Constraint with Chroma Split Constraint Some embodiments of the present invention define a root block according to one or more predefined criteria, and implement both the mode and chroma split constraints within the root block. Once a root block is set, chroma components of the root block cannot be further split no matter which prediction mode the root block is, and if a luma component of the root block is split into smaller luma blocks, these smaller luma blocks within the root block must be coded using the same prediction mode. For example, all luma blocks within a root block are either coded in inter prediction or in non-inter prediction, and there is only one chroma block in the corresponding chroma root block no matter the luma blocks are coded in inter prediction or non-inter prediction. The luma blocks may be coded in intra prediction or IBC mode when all the luma blocks split from a root block are coded in non-inter prediction in this example.

To encode or decode blocks in an inter slice, a root block is first determined as all blocks within this root block must have the same prediction mode, for example, intra prediction or inter prediction, a luma component of this root block can be further partitioned into smaller luma blocks, but chroma components of this root block cannot be further partitioned, which results in multiple luma blocks correspond to one single chroma block. If this single chroma block is coded in the DM mode, one of luma intra prediction modes of the corresponding luma blocks is used as the intra prediction mode of the chroma block. The chroma block code in the DM mode is encoded or decoded using an intra prediction mode of a reference luma block, and the reference luma block is one of the four corner blocks, such as a top-left corner luma block, or the reference luma block is one of the center blocks, such as a bottom-right-center luma block as shown in FIG. 4. Only one intra prediction mode is signaled for this chroma block in the root block. In cased when the chroma block is coded in inter prediction, one of MVs of the corresponding luma blocks is used as a MV of this chroma block. For example, the MV of a reference luma block in the root block is used as the MV of the chroma block, and the reference luma block is one of the four corner luma blocks or one of the center blocks.

Combining Mode Constraint and Conditional Chroma Split Constraint Some embodiments of the present invention determine a root block, and a luma component of this root block can be further partitioned into smaller luma blocks, whether chroma components of the root block can be further partitioned is decided by a prediction mode of the one or more luma blocks within the root block.

In one embodiment of processing video data in an inter slice or in a slice coded in share-tree partitioning, a root block is determined so that all blocks within the root block must be coded in the same prediction mode, for example, there are two different prediction modes: inter prediction and non-inter prediction, intra prediction and non-intra prediction, or inter prediction and intra prediction, or there are three different prediction modes: inter prediction, intra prediction, and IBC. The chroma split constraint is adaptively applied to a current block according to a prediction mode of the current block when the current block is set to be a root block. For example, a luma component of a root block can be further partitioned into smaller luma blocks, and if all blocks within the root block are coded in inter prediction, chroma components follow the partitioning of the luma component. That is the chroma split constraint is not applied when corresponding luma blocks are coded in inter prediction. If all blocks within the root block are coded in intra prediction or non-inter prediction, chroma components of this root block cannot be further partitioned as the chroma split constraint is applied when corresponding luma blocks are coded in intra prediction or non-inter prediction such as intra prediction or IBC mode. In other words, only when a luma component in a root block is partitioned into smaller luma blocks and these luma blocks are coded in intra prediction or IBC mode, multiple luma blocks may correspond to one chroma block in share-tree block partitioning.

When multiple luma blocks correspond to one chroma block in the root block and the chroma block is coded in the DM mode, an intra prediction mode for encoding or decoding the chroma block is derived according to the luma intra prediction mode of one predefined position in the root block. In one embodiment, the inter prediction mode of the chroma block coded in the DM mode is derived from a center CU of the root block, for example, the bottom-right-center block illustrated in FIG. 4. In another embodiment, the intra prediction mode of the chroma block coded in the DM mode is derived from a top-left CU of the root block. In another embodiment, the intra prediction mode of the chroma block coded in the DM mode is derived from a first or last CU of the root block. In yet another embodiment, the intra prediction mode of the chroma block coded in the DM mode is derived from a first intra-coded CU of the root block.

All blocks within a root block are coded using the same prediction mode when the mode constraint is applied, and according to various embodiments, three cases with different definitions of the same prediction mode are listed in the followings. In case 1, the same prediction mode means all the blocks within the root block must be coded in one of intra prediction, inter prediction, and IBC. In case 2, the same prediction mode means all the blocks within the root block must be coded in intra prediction or non-intra prediction, where inter prediction and IBC are considered as non-intra prediction. In case 3, the same prediction mode means all the blocks within the root block must be coded in inter prediction or non-inter-prediction, where intra prediction and IBC are considered as non-inter prediction. In one embodiment, if all luma blocks within a root block are coded in inter prediction in case 1, inter prediction or IBC in case 2, or inter prediction in case 3, partitioning of chroma components follows partitioning of the luma blocks in the root block. If all luma blocks within a root block are coded in intra prediction in case 1, intra prediction in case 2, or intra prediction or IBC in case 3, then chroma components of this root block cannot be further split, so the luma blocks in the root block correspond to one chroma block.

Deblocking Modifications in Chroma Split Constraint To process blocks in an inter slice or blocks partitioned by share-tree block partitioning, if a root block containing luma and chroma components with different partitioning structures, a deblocking filter process for luma and chroma components will be separately performed. That is, Boundary Strength (BS) settings of luma blocks cannot be reused by corresponding chroma blocks. The BS settings of the chroma blocks will be separately set, and then deblocking filtering is applied to the chroma components.

Disallow Intra Prediction or IBC in Small Blocks In some other embodiments, in an inter slice, a smallest CU size or area, a smallest width or height, or a maximum depth of intra coded CUs, IBC coded CUs, or both intra and IBC coded CU is defined by a predefined value. Intra prediction is disallowed if a size, area, width, or height of a current block is smaller than the predefined value, or if a depth of the current block is larger than the predefined value. Two methods can be applied when intra prediction is disallowed, one method is to disable intra prediction modes by inferring the prediction mode of the CU as non-intra mode, for example inferring the prediction mode of the CU as an inter prediction mode. The other method disables intra prediction modes by signaling syntaxes for a CU to indicate the prediction mode of the CU, however intra prediction modes are forbidden to be selected for the CU.

Disallow Ternary Tree Split in Small Blocks In one embodiment, to prevent a root block being larger than a predefined threshold, a block with a size equal to two times the predefined threshold cannot be partitioned by ternary tree splitting or quadtree splitting in share-tree block partitioning. This constraint can make sure the size of each root block always equals to the predefined threshold. In another embodiment, in both share-tree and dual-tree block partitioning, a block with a size equal to two times the predefined threshold cannot be further split by ternary tree splitting or quadtree splitting.

Figure 5:
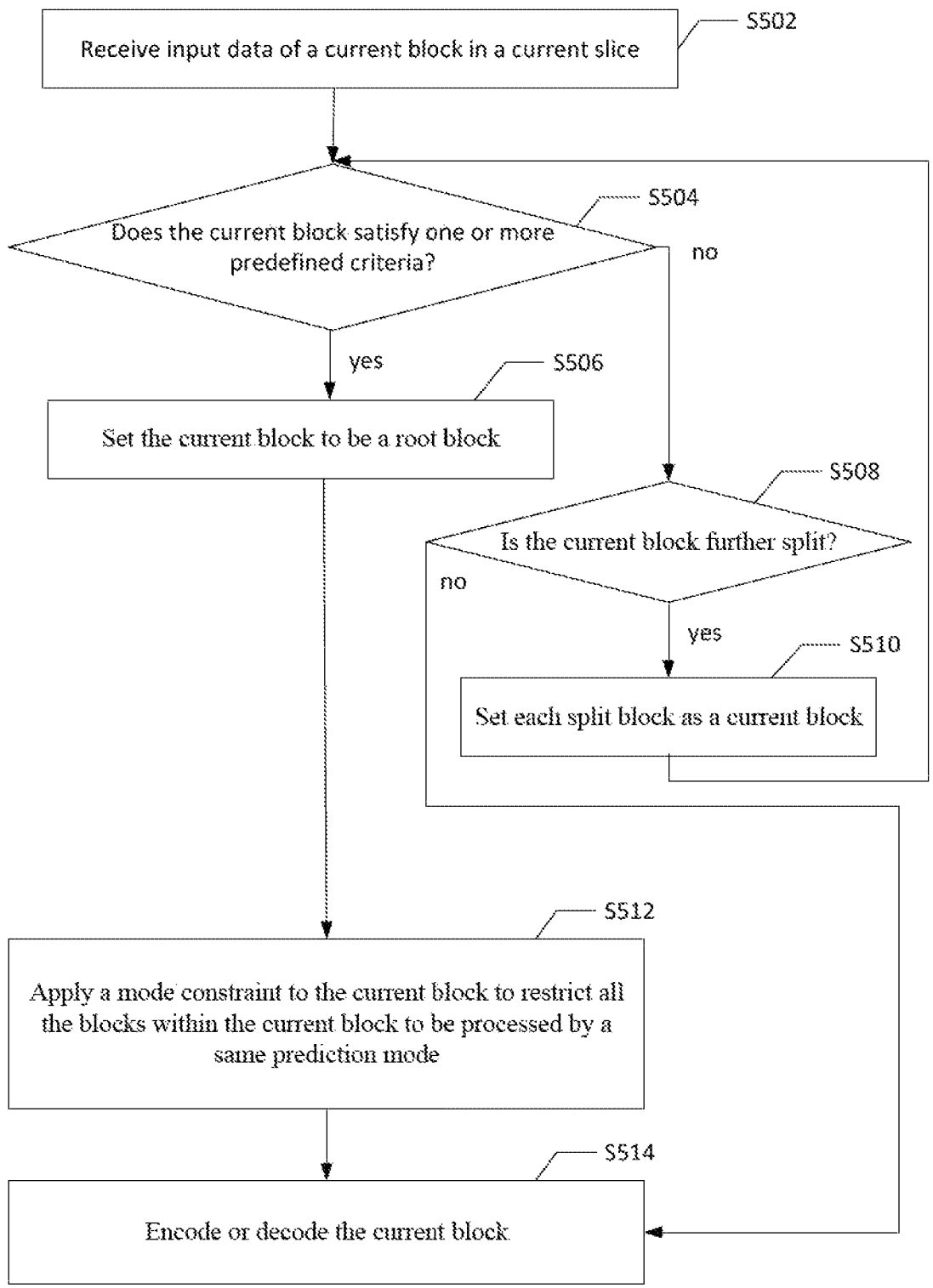
FIG. 5 is a flowchart illustrating a video processing method for encoding or decoding a current block according to an exemplary embodiment of the present invention.

Representative Flowchart FIG. 5 is a flowchart illustrating a video processing method for processing a current block according to an embodiment of applying a mode constraint within each root block. The video processing method illustrated in FIG. 5 may be implemented in a video encoder or video decoder. The video encoder or video decoder receives input data of a current block in step S502 and checks whether one or more components of the current block satisfy one or more predefined criteria in step S504. A predefined criterion may be related to a size, width, height, depth, splitting type, or a combination of the above criteria of the current block or a block split from the current block. For example, the luma component of the current block satisfies a predefined criterion if a size of the current block is less than, equal to, or less than or equal to a threshold. The current block is set to be a root block in step S506 if the current block satisfies the predefined criteria in step S504, and step S512 applies a mode constraint to the current block to restrict all blocks within the current block to be processed by a same prediction mode. Blocks in the current block are encoded or decode using the same prediction mode in step S514. If one or more component of the current block does not satisfy the predefined criteria in step S504, step S508 checks whether the current block is further split. If the current block is split into smaller blocks, each block split from the current block is then set as a current block in step S510 and proceed to step S504 to check whether it satisfies the predefined criteria. If the current block is not further split as it is a leaf block, the current block is encoded or decoded in step S514.

Figure 6:
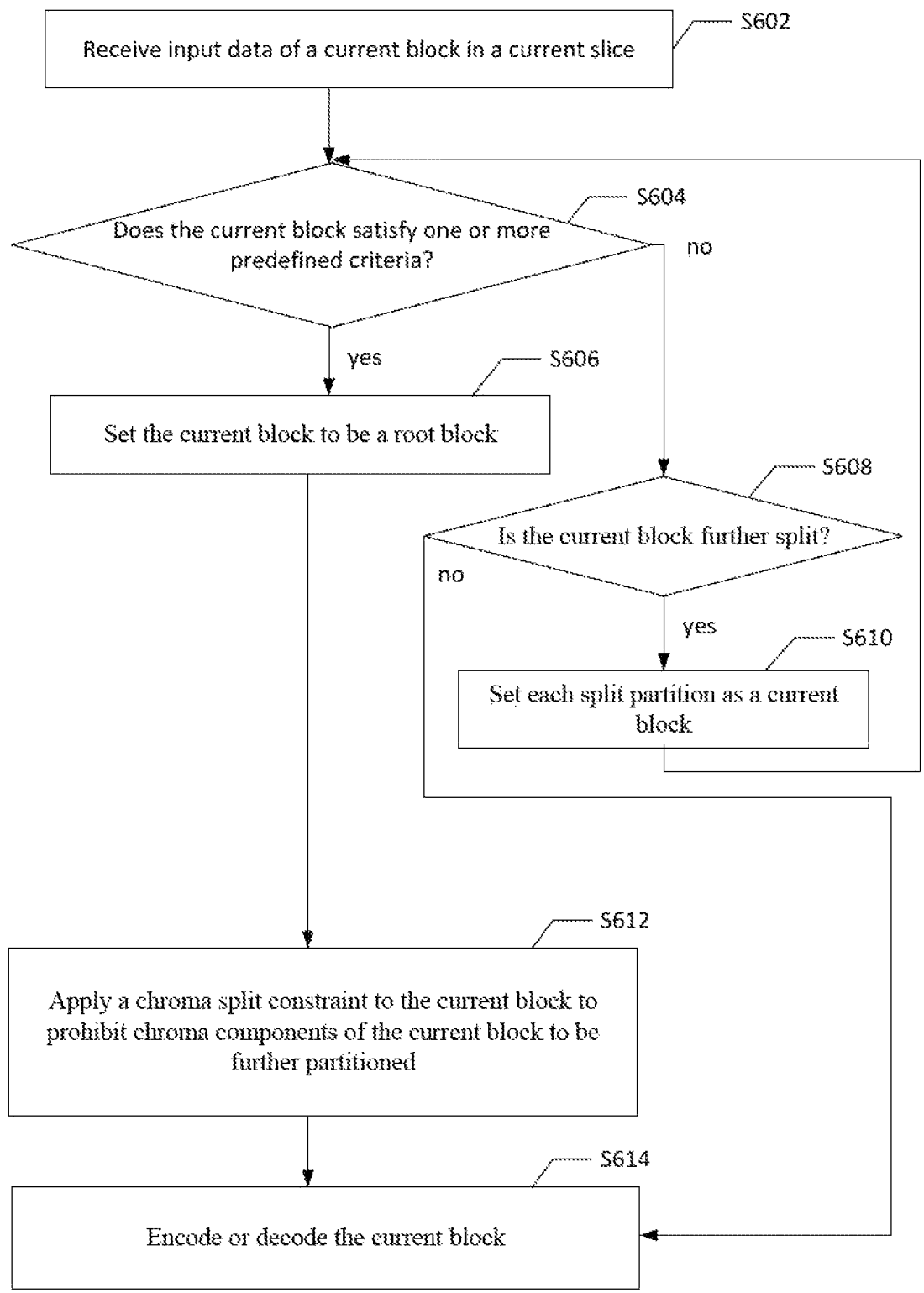
FIG. 6 is a flowchart illustrating a video processing method for encoding or decoding a current block according to another exemplary embodiment of the present invention.

FIG. 6 is a flowchart illustrating a video processing method for processing a current block according to an embodiment of applying a chroma split constraint within each root block. The video processing method illustrated in FIG. 6 may be implemented in a video encoder or video decoder. The video encoder or video decoder receives input data of a current block in step S602 and checks whether the current block satisfy one or more predefined criteria in step S604. A predefined criterion may be related to a size, width, height, depth, splitting type, or a combination of the above criteria of the current block or a block split from the current block. For example, the current block satisfies the predefined criteria if a size of the current block is less than, equal to, or less than or equal to a size threshold and a splitting type of the current block is equal to a predefined splitting type. The current block is set to be a root block in step S606 if the current block satisfies the predefined criteria in step S604. After setting the current block as a root block, a chroma split constraint is applied to the current block to prohibit chroma components of the current block to be further partitioned while a luma component of the current block is allowed to be partitioned in step S612, and the current block is encoded or decoded in step S614. In one specific embodiment, the chroma split constraint is applied if the luma component of the current block is coded in non-inter prediction mode, and the chroma split constraint is not applied if the luma component of the current block is coded in inter prediction. If the result of step S604 is no, step S608 checks whether the current block is further split into small blocks. If the result of step S608 is yes as the current block is split into multiple blocks, each block split from the current block is set as a current block in step S610 and proceed to step S604 to check if each block satisfies the predefined criteria. If the result of step S608 is no as the current block is a leaf block, the current block is encoded or decoded in step S614.

Figure 7:
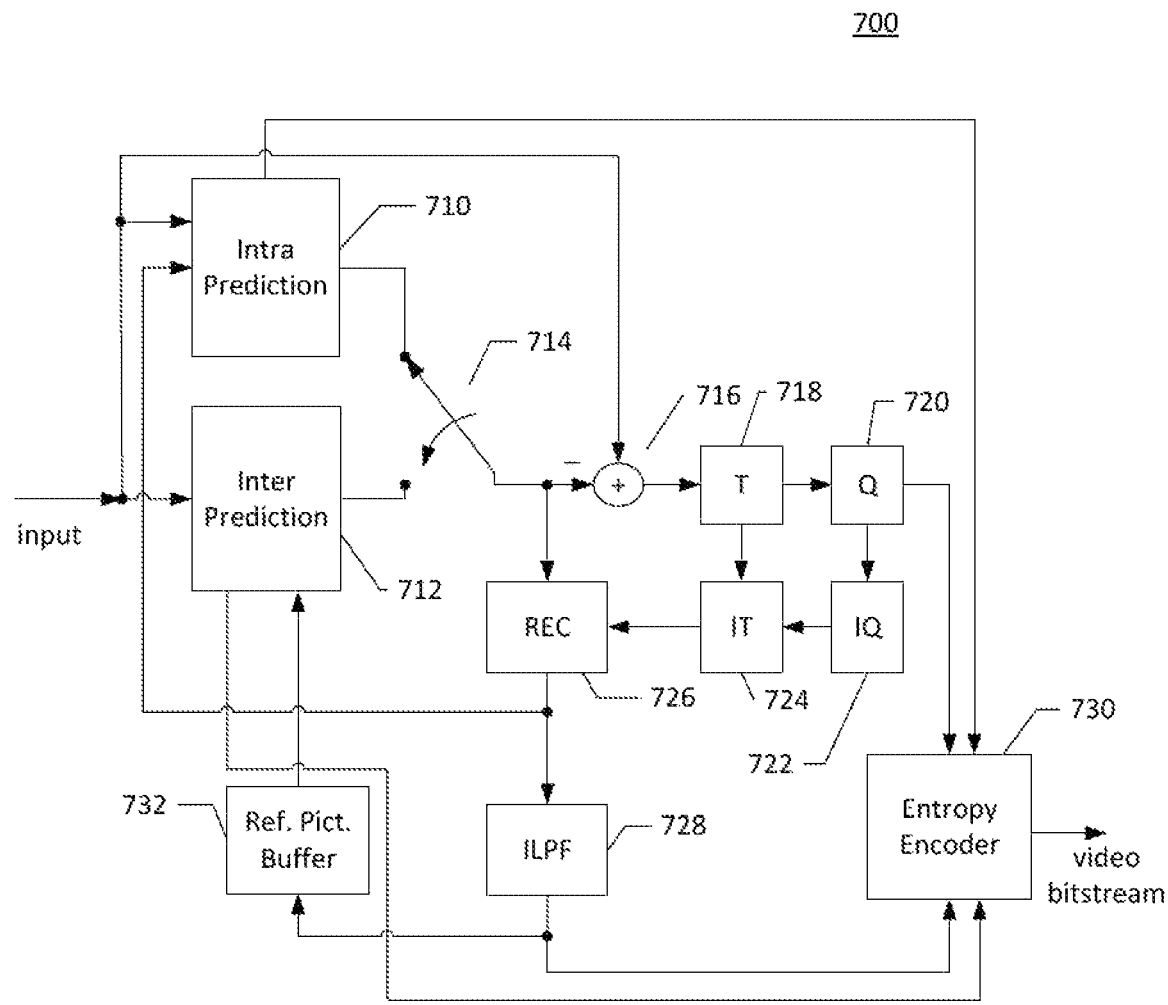
FIG. 7 illustrates an exemplary system block diagram for a video encoding system incorporating the video processing method according to embodiments of the present invention.

Representative Block Diagrams Any of the foregoing described video processing methods can be implemented in encoders, decoders, or both the encoders and decoders, for example, any of the video processing methods is implemented in an intra prediction module or block partition module of an encoder or decoder. Alternatively, any of the video processing methods can be implemented as a circuit coupled to the intra prediction module or block partition module of the encoder or decoder, so as to provide information needed by the intra prediction module or block partition module. FIG. 7 illustrates an exemplary system block diagram for a Video Encoder 700 implementing one or more of the video processing methods of the present invention. The Video Encoder 700 receives input data of a current block in a current slice and determines whether the current block is a root block by checking with one or more predefined criteria. For example, the current block is set to be a root block if a size of the current block is equal to a first predefined threshold and a splitting type for partitioning the current block is equal to a first splitting type or if the size of the current block is equal to a second predefined threshold and the splitting type is equal to a second splitting type. In some embodiments of the present invention, a mode constraint is applied to restrict all blocks within a root block to be processed by a same prediction mode; that is when the current block is set to be a root block and is further split into multiple children blocks, the children blocks are coded in the same prediction mode. In one embodiment, all the children blocks within a root block are either processed by intra prediction or inter prediction, and in another embodiment, all the children blocks within a root block are either processed by inter prediction or non-inter prediction including intra prediction and IBC. In cases when the current block is set to be a root block and all the children blocks within the current block are processed by intra prediction, Intra Prediction module 710 provides an intra predictor for each children block based on reconstructed samples of the current slice according to an intra prediction mode. In cases when the current block is not a root block and is further split into children blocks, each children block will be checked with the one or more predefined criteria to determine if it is a root block. In cases when the current block is set to be a root block and all the children blocks within the current block are processed by inter prediction, Inter Prediction module 712 performs motion estimation (ME) and motion compensation (MC) for each children block to provide inter predictors based on video data from other picture or pictures. Either Intra Prediction module 710 or Inter Prediction module 712 supplies the selected predictors to Adder module 716 to form prediction errors, also called prediction residues. In some embodiments of the present invention, a chroma split constraint is applied to the current block when the current block is set to be a root block. The chroma split constraint prohibits further splitting chroma components of the current block, which may cause multiple luma blocks within the current block correspond to a single chroma block. In one specific embodiment, the chroma split constraint is only applied to root blocks to be coded in intra prediction.

The prediction residues of the current block are further processed by Transformation module (T) 718 followed by Quantization module (Q) 720. The transformed and quantized residual signal is then encoded by Entropy Encoder 734 to form an encoded video bitstream. The encoded video bitstream is then packed with side information. The transformed and quantized residual signal of the current block is processed by Inverse Quantization module (IQ) 722 and Inverse Transformation module (IT) 724 to recover the prediction residues. As shown in FIG. 7, the prediction residues are recovered by adding back to the selected predictor at Reconstruction module (REC) 726 to produce reconstructed samples. The reconstructed samples may be stored in Reference Picture Buffer (Ref. Pict. Buffer) 732 and used for prediction of other pictures. The reconstructed samples from REC 726 may be subject to various impairments due to the encoding processing, consequently, in-loop processing Deblocking Filter (DF) 728 and Sample Adaptive Offset (SAO) 730 are applied to the reconstructed samples before storing in the Reference Picture Buffer 732 to further enhance picture quality. Syntax associated with information for the in-loop processing DF 728 are provided to Entropy Encoder 7304 f[DC(3] incorporation into the encoded video bitstream.

Figure 8:
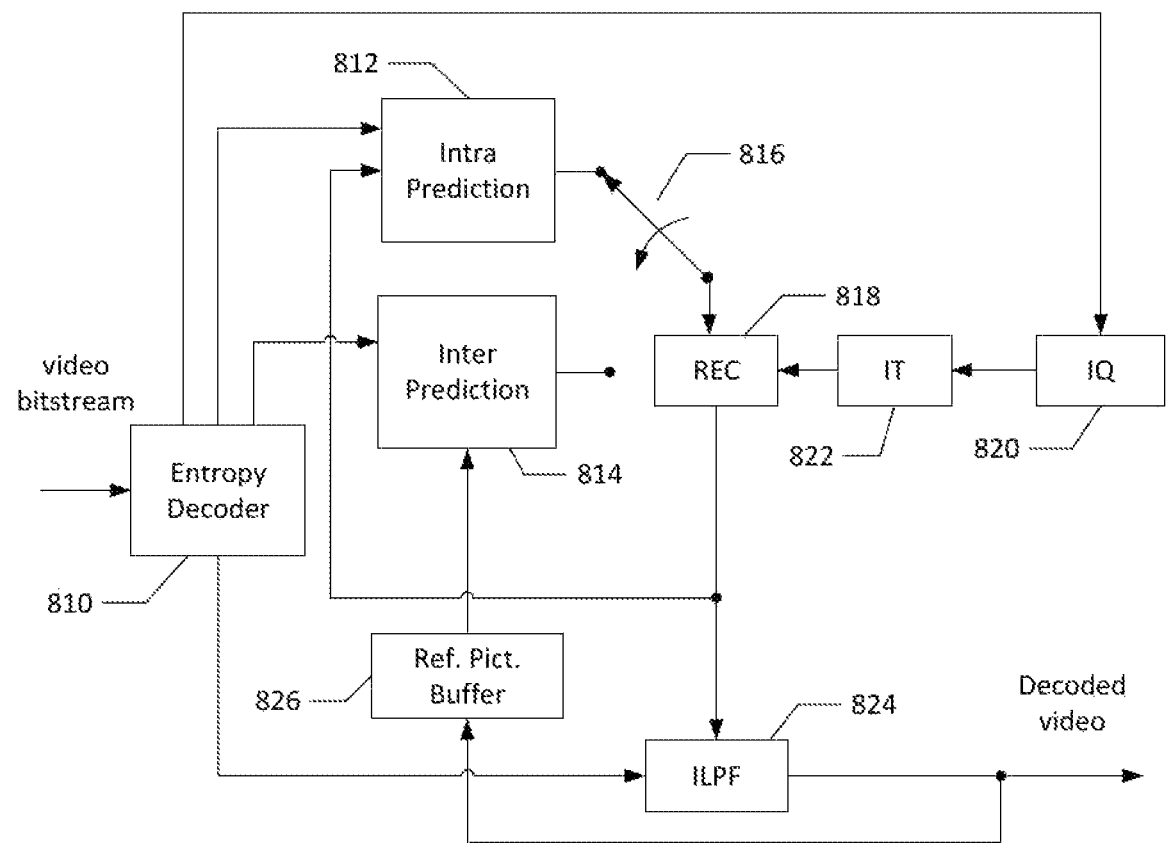
FIG. 8 illustrates an exemplary system block diagram for a video decoding system incorporating the video processing method according to embodiments of the present invention.

A corresponding Video Decoder 800 for decoding the video bitstream generated by Video Encoder 700 of FIG. 7 is shown in FIG. 8. The encoded video bitstream is the input to Video Decoder 800 and is decoded by Entropy Decoder 810 to parse and recover the transformed and quantized residual signal and other system information. The decoding process of Decoder 800 is similar to the reconstruction loop at Encoder 700, except Decoder 800 only requires motion compensation prediction in Inter Prediction module 814. A current block is checked with one or more predefined criteria during partitioning, and is set as a root block if the current block satisfies the predefined criteria. In some embodiments of the present invention, a mode constraint is applied to the current block to restrict all blocks within the current block to be processed by a same prediction mode if the current block is a root block. For example, all blocks within a root block are decoded by either Intra Prediction module 812 or Inter Prediction module 814. In some embodiments, a chroma split constraint is applied to restrict further partitioning chroma components of the current block if the current block is a root block, and in one specific embodiment, the chroma split constraint is only applied to the current block coded in intra prediction if the current block is set as a root block. Switch module 816 selects an intra predictor from Intra Prediction module 812 or Inter predictor from Inter Prediction module 814 according to decoded mode information. The transformed and quantized residual signal associated with each block is recovered by Inverse Quantization module (IQ) 820 and Inverse Transformation module (IT) 822. The recovered transformed and quantized residual signal is reconstructed by adding back the predictor in REC module 818 to produce reconstructed samples. The reconstructed samples are further processed by DF 824 to generate final decoded video. If the currently decoded picture is a reference picture, the reconstructed samples of the currently decoded picture are also stored in Ref. Pict. Buffer 826 [DC(4] for later pictures in decoding order.

Various components of Video Encoder 700 and Video Decoder 800 in FIG. 7 and FIG. 8 may be implemented by hardware components, one or more processors configured to execute program instructions stored in a memory, or a combination of the hardware and processor. For example, a processor executes program instructions to control receiving of input data associated with a current block in a current picture. The processor is equipped with a single or multiple processing cores. In some examples, the processor executes program instructions to perform functions in some components in Encoder 700 and Decoder 800, and the memory electrically coupled with the processor is used to store the program instructions, information corresponding to the reconstructed images of blocks, and/or intermediate data during the encoding or decoding process. The memory in some embodiment includes a non-transitory computer readable medium, such as a semiconductor or solid-state memory, a random access memory (RAM), a read-only memory (ROM), a hard disk, an optical disk, or other suitable storage medium. The memory may also be a combination of two or more of the non-transitory computer readable medium listed above. As shown in FIGS. 7 and 8, Encoder 700 and Decoder 800 may be implemented in the same electronic device, so various functional components of Encoder 700 and Decoder 800 may be shared or reused if implemented in the same electronic device. For example, one or more of Reconstruction module 726, Inverse Transformation module 724, Inverse Quantization module 722, Deblocking Filter 728, Sample Adaptive Offset 730, and Reference Picture Buffer 732 in FIG. 7 may also be used to function as Reconstruction module 818, Inverse Transformation module 822, Inverse Quantization module 820, Deblocking Filter 824, and Reference Picture Buffer 826 [DC(5] in FIG. 8.

Embodiments of the processing method for a video coding system may be implemented in a circuit integrated into a video compression chip or program code integrated into video compression software to perform the processing described above. For examples, checking if the current block satisfies one or more predefined criteria may be realized in program code to be executed on a computer processor, a Digital Signal Processor (DSP), a microprocessor, or field programmable gate array (FPGA). These processors can be configured to perform particular tasks according to the invention, by executing machine-readable software code or firmware code that defines the particular methods embodied by the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of processing video data in a video coding system, comprising:
receiving input data associated with a current block in a current slice;
determining whether one or more components of the current block satisfy one or more predefined criteria during partitioning;
applying a mode constraint to the current block only if the one or more components of the current block satisfy the one or more predefined criteria, wherein the mode constraint restricts all blocks within the current block to be processed by a same prediction mode when the current block is split into a plurality of blocks;
adaptively splitting the current block into one or more blocks;

signaling or parsing one or more prediction mode syntax elements of a first block in the current block according to a constrained mode of the current block when the one or more components of the current block satisfy the one or more predefined criteria; and encoding or decoding the current block with the mode constraint when the one or more components of the current block satisfy the one or more predefined criteria or encoding or decoding the current block without the mode constraint when the one or more components of the current block do not satisfy the one or more predefined criteria.

2. The method of claim 1, wherein setting the current block to a pre-defined status if the one or more components of the current block satisfy the one or more predefined criteria.

3. The method of claim 2, wherein setting the current block to the pre-defined status comprises setting the current block to be a root block.

4. The method of claim 1, wherein the one or more prediction mode syntax elements of remaining blocks in the current block are signaled or parsed, and the prediction mode syntax elements of all blocks in the current block correspond to the same prediction mode when the one or more components of the current block satisfy the one or more predefined criteria.

5. The method of claim 1, wherein one or more prediction mode syntax elements of remaining blocks in the current block are not signaled or parsed when the one or more components of the current block satisfy the one or more predefined criteria, wherein prediction modes of the remaining blocks in the current block are derived from the one or more prediction mode syntax elements of the first block in the current block.

6. The method of claim 5, wherein one or more prediction mode syntax elements of the remaining blocks in the current block are signaled or parsed if the constrained mode is non-inter mode and the one or more components of the current block satisfy the one or more predefined criteria.

7. An apparatus of processing video data in a video coding system, the apparatus comprising one or more electronic circuits configured for:

receiving input data associated with a current block in a current slice;

determining whether one or more components of the current block satisfy one or more predefined criteria during partitioning;

applying a mode constraint to the current block only if the one or more components of the current block satisfy the one or more predefined criteria, wherein the mode constraint restricts all blocks within the current block to be processed by a same prediction mode when the current block is split into a plurality of blocks;

adaptively splitting the current block into one or more blocks;

signaling or parsing one or more prediction mode syntax elements of a first block in the current block according to a constrained mode of the current block when the one or more components of the current block satisfy the one or more predefined criteria; and encoding or decoding the current block with the mode constraint when the one or more components of the current block satisfy the one or more predefined criteria or encoding or decoding the current block without the mode constraint when the one or more components of the current block do not satisfy the one or more predefined criteria.

8. A method of processing video data in a video coding system, comprising:

receiving input data associated with a current block in a current slice;

determining whether one or more components of the current block satisfy one or more predefined criteria during partitioning;

applying a mode constraint to the current block only if the current block satisfy the one or more predefined criteria during partitioning, wherein the mode constraint restricts all blocks within the current block to be processed by a same prediction mode when the current block is split into a plurality of blocks;

adaptively splitting the current block into one or more blocks, wherein chroma components of the current block are not allowed to be further partitioned if a luma component of the current block is coded in non-inter prediction, and the chroma components of the current block are allowed to be further partitioned if the luma component of the current block is coded in inter prediction; and encoding or decoding the current block with the mode constraint when the current block satisfy the one or more predefined criteria during partitioning or encoding or decoding the current block without the mode constraint when the current block do not satisfy the one or more predefined criteria during partitioning.

9. An apparatus of processing video data in a video coding system, the apparatus comprising one or more electronic circuits configured for:

receiving input data associated with a current block in a current slice;

determining whether one or more components of the current block satisfy one or more predefined criteria during partitioning;

applying a mode constraint to the current block only if the current block satisfy the one or more predefined criteria during partitioning, wherein the mode constraint restricts all blocks within the current block to be processed by a same prediction mode when the current block is split into a plurality of blocks;

adaptively splitting the current block into one or more blocks, wherein chroma components of the current block are not allowed to be further partitioned if a luma component of the current block is coded in non-inter prediction, and the chroma components of the current block are allowed to be further partitioned if the luma component of the current block is coded in inter prediction; and encoding or decoding the current block with the mode constraint when the current block satisfy the one or more predefined criteria during partitioning or encoding or decoding the current block without the mode constraint when the current block do not satisfy the one or more predefined criteria during partitioning.

* * * * *